US010085543B2

(12) United States Patent
Breit et al.

(10) Patent No.: US 10,085,543 B2
(45) Date of Patent: Oct. 2, 2018

(54) PET WATER BOTTLE ASSEMBLY

(71) Applicant: O2Cool, LLC, Chicago, IL (US)

(72) Inventors: Oliver Breit, Discovery Bay (HK); Eric F. Junkel, Mount Prospect, IL (US); Michael Ksiazek, Burr Ridge, IL (US)

(73) Assignee: O2COOL, LLC, Chicago, IL (US)

( * ) Notice: Subject to any disclaimer, the term of this patent is extended or adjusted under 35 U.S.C. 154(b) by 133 days.

(21) Appl. No.: 15/171,115

(22) Filed: Jun. 2, 2016

(65) Prior Publication Data

US 2016/0316896 A1    Nov. 3, 2016

Related U.S. Application Data

(63) Continuation-in-part of application No. 29/525,515, filed on Apr. 30, 2015, now Pat. No. Des. 758,675, and a continuation-in-part of application No. 29/525,573, filed on Apr. 30, 2015, now Pat. No. Des. 758,132, and a continuation-in-part of application No. 29/526,096, filed on May 6, 2015, now Pat. No. Des. 774,351.

(51) Int. Cl.
| | |
|---|---|
| *A01K 7/00* | (2006.01) |
| *A45F 3/00* | (2006.01) |
| *A45F 3/16* | (2006.01) |
| *B65D 23/14* | (2006.01) |
| *A45F 5/10* | (2006.01) |
| *B65D 23/00* | (2006.01) |

(52) U.S. Cl.
CPC .............. *A45F 3/16* (2013.01); *A01K 7/00* (2013.01); *A45F 5/102* (2013.01); *B65D 23/003* (2013.01); *B65D 23/14* (2013.01); *A45F 2200/055* (2013.01); *A45F 2200/0583* (2013.01)

(58) Field of Classification Search
CPC ........ A01K 7/00; A01K 5/0114; A01K 7/005; A45F 3/16; A45F 5/102
USPC ..... 119/51.5, 61.5, 61.53, 51.01, 62, 73, 75, 119/72; 215/386, 396, 399, 237, 390, 215/395; 220/758, 903
See application file for complete search history.

(56) References Cited

U.S. PATENT DOCUMENTS

| | | |
|---|---|---|
| D101,329 S | 9/1936 | Cory |
| D178,919 S | 10/1956 | Grebowiec |
| D186,040 S | 9/1959 | Stageberg |
| 3,155,263 A | 11/1964 | Hidding |
| D217,828 S | 6/1970 | Hilliard |
| 3,785,348 A | 1/1974 | Polidori, Sr. et al. |
| 3,978,233 A | 8/1976 | Bolt |

(Continued)

*Primary Examiner* — Yvonne R Abbott-Lewis
(74) *Attorney, Agent, or Firm* — Thompson Coburn LLP

(57) ABSTRACT

A pet water bottle assembly comprising an upper bottle member and a cup member. An upstanding wall and an upwardly facing bottom surface of the cup member collectively define a reservoir adapted to hold liquid. The upstanding wall has a first circumferential wall portion with a first wall portion height and a second circumferential wall portion with a second wall portion height. The first wall portion height is greater than the second wall portion height to thereby provide a pet enhanced access to liquid within the reservoir when the cup member is tilted such that a top surface of liquid in the reservoir is level with the first axial extent. The cup member is adapted such that the upper bottle member snugly nests within the cup member.

11 Claims, 11 Drawing Sheets

(56) References Cited

U.S. PATENT DOCUMENTS

| | | | |
|---|---|---|---|
| D244,947 S | 7/1977 | Gerber | |
| 4,357,905 A | 11/1982 | Carpenter | |
| 4,922,858 A | 5/1990 | Ahrens | |
| D313,488 S | 1/1991 | Conner | |
| D313,489 S | 1/1991 | Conner | |
| D322,887 S | 1/1992 | Kraker | |
| 5,222,656 A | 6/1993 | Carlson | |
| D353,232 S | 12/1994 | Chrisco | |
| D370,386 S | 6/1996 | Pallesen | |
| D373,449 S | 9/1996 | Chen | |
| D373,858 S | 9/1996 | Chen | |
| D374,516 S | 10/1996 | Lillelund et al. | |
| 5,573,152 A | 11/1996 | Arnold | |
| 5,636,592 A * | 6/1997 | Wechsler | A01K 7/02 119/52.1 |
| D385,068 S | 10/1997 | Malcolm | |
| 5,775,255 A | 7/1998 | Louviere, III | |
| D398,478 S | 9/1998 | Spencer | |
| 5,806,904 A | 9/1998 | Smith | |
| D403,958 S | 1/1999 | Stepek | |
| D412,087 S | 7/1999 | Spencer | |
| D412,938 S | 8/1999 | Kesselring et al. | |
| 5,960,742 A * | 10/1999 | O'Rourke | A01K 7/02 119/74 |
| 5,960,973 A | 10/1999 | Markson | |
| 6,145,474 A | 11/2000 | Lemkin | |
| D442,443 S | 5/2001 | Perndocaj et al. | |
| D458,419 S | 6/2002 | Ross | |
| 6,405,675 B1 * | 6/2002 | Mills | A01K 7/00 119/51.5 |
| D467,045 S | 12/2002 | Tsengas | |
| D467,687 S | 12/2002 | Tangolics | |
| D480,308 S | 10/2003 | Grisdale et al. | |
| D486,273 S | 2/2004 | Tsengas | |
| D486,274 S | 2/2004 | Tsengas | |
| D489,256 S | 5/2004 | Kelleghan | |
| D489,847 S | 5/2004 | Tsengas | |
| D490,235 S | 5/2004 | Nykoluk | |
| D491,465 S | 6/2004 | Kelleghan | |
| D491,697 S | 6/2004 | Tsengas | |
| D496,588 S | 9/2004 | Matsuo | |
| 6,854,419 B1 | 2/2005 | Tsengas | |
| D502,395 S | 3/2005 | Blanchester | |
| D503,309 S | 3/2005 | Yu | |
| D503,589 S | 4/2005 | Schuler | |
| D508,957 S | 8/2005 | Jensen | |
| 7,073,461 B2 | 7/2006 | Gonet | |
| D535,562 S | 1/2007 | Wisler et al. | |
| D571,214 S | 6/2008 | Caszatt | |
| D588,921 S | 3/2009 | Williams | |
| D592,911 S | 5/2009 | Buchanan | |
| D594,708 S | 6/2009 | Silverstein et al. | |
| D600,973 S | 9/2009 | Lane | |
| D606,861 S | 12/2009 | Pavlinac | |
| 7,690,329 B2 * | 4/2010 | Parks | A01K 7/00 119/72 |
| D617,134 S | 6/2010 | Perkins | |
| D626,409 S | 11/2010 | Hooley | |
| D640,327 S | 6/2011 | Gorzo | |
| D646,442 S | 10/2011 | Chance et al. | |
| D657,196 S | 4/2012 | Beyers, III | |
| 8,272,351 B2 * | 9/2012 | Hurwitz | A01K 7/00 119/74 |
| 8,365,941 B2 | 2/2013 | Mayer | |
| D684,432 S | 6/2013 | Stein et al. | |
| 8,621,885 B1 | 1/2014 | Niebolte | |
| D700,408 S | 2/2014 | Dixon et al. | |
| D701,355 S * | 3/2014 | Yamasaki | D30/132 |
| D703,040 S | 4/2014 | White | |
| D709,387 S | 7/2014 | Marina et al. | |
| 8,783,487 B2 | 7/2014 | Hojo | |
| 8,807,082 B2 | 8/2014 | Alfonso | |
| D717,006 S | 11/2014 | Alfonso | |
| D729,543 S | 5/2015 | Gicante et al. | |
| 9,155,285 B2 * | 10/2015 | Li | A01K 7/00 |
| D756,791 S | 5/2016 | Tomasson et al. | |
| D758,132 S | 6/2016 | Breit | |
| D759,495 S | 6/2016 | Hawry | |
| D760,543 S | 7/2016 | Lue et al. | |
| D764,231 S | 8/2016 | Szymanski | |
| 9,402,374 B2 * | 8/2016 | Landon | A01K 5/0114 |
| D767,993 S | 10/2016 | Joshi et al. | |
| D768,507 S | 10/2016 | Hotell | |
| D786,018 S | 5/2017 | Willows et al. | |
| D786,617 S | 5/2017 | Breit | |
| 2004/0050959 A1 * | 3/2004 | Mazooji | B05B 3/02 239/263.1 |
| 2006/0144861 A1 * | 7/2006 | Harrison | A47K 5/12 222/173 |
| 2007/0017451 A1 * | 1/2007 | Hurwitz | A01K 7/00 119/74 |
| 2007/0017452 A1 * | 1/2007 | Hurwitz | A01K 7/00 119/74 |
| 2007/0079762 A1 * | 4/2007 | Stephanos | A01K 7/00 119/74 |
| 2007/0145108 A1 | 6/2007 | Dexel et al. | |
| 2008/0282907 A1 | 11/2008 | Begin et al. | |
| 2009/0266737 A1 | 10/2009 | Cole | |
| 2009/0283047 A1 * | 11/2009 | Swenson | A01K 5/0114 119/61.55 |
| 2010/0107984 A1 | 5/2010 | Uffner et al. | |
| 2010/0187256 A1 | 7/2010 | Draisma | |
| 2010/0300363 A1 * | 12/2010 | Nangia | A01K 7/00 119/51.01 |
| 2011/0204048 A1 | 8/2011 | Carino et al. | |
| 2012/0193316 A1 | 8/2012 | Starks | |
| 2012/0311899 A1 | 12/2012 | Mathewson et al. | |
| 2014/0165919 A1 | 6/2014 | O'Connor | |
| 2015/0272360 A1 | 10/2015 | Knowlton | |
| 2015/0359366 A1 | 12/2015 | Yan et al. | |
| 2016/0050884 A1 * | 2/2016 | Ross | A01K 7/00 119/74 |

\* cited by examiner

PET WATER BOTTLE ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND

Field

This invention pertains to a water bottle assembly.

SUMMARY

One aspect of the present disclosure is a pet water bottle assembly comprising an upper bottle member and a cup member. The upper bottle member comprises a hollow body and a bottle finish. The hollow body has an upper portion and a downwardly facing bottom surface. The bottle finish extends upwardly from the upper portion of the hollow body. The hollow body defines a cavity capable of receiving and holding liquid. The bottle finish defines an opening arranged and adapted to enable passage of liquid into and out of the cavity via the opening. The cup member has an upstanding wall, an upwardly facing bottom surface, and a first connector. The upstanding wall and the upwardly facing bottom surface collectively define a reservoir adapted to hold liquid. The upstanding wall has a first circumferential wall portion and a second circumferential wall portion. The first and second circumferential wall portions are diametrically opposite each other relative to a central axis. Each of the first and second circumferential wall portions have an inner surface and an outer surface. The first circumferential wall portion has a first axial extent and the second circumferential wall portion has a second axial extent. The first axial extent is the maximum extent to which liquid within the reservoir can extend without spilling when a first quantity of water is within the reservoir. The cup member is configured such that the central axis is at a first angle from vertical when the first quantity of water is within the reservoir and a top surface of the first quantity of water is level with the first axial extent. The second axial extent is the maximum extent to which liquid within the reservoir can extend without spilling when the first quantity of water is within the reservoir. The cup member is configured such that the central axis is at a second angle from vertical when the first quantity of water is in the reservoir and the top surface of the first quantity of water is level with the first axial extent. The first angle is greater than the second angle. The first circumferential wall portion has a first wall portion height and the second circumferential wall portion has a second wall portion height. The first wall portion height is greater than the second wall portion height to thereby provide a pet enhanced access to liquid within the reservoir when the cup member is tilted such that a top surface of liquid in the reservoir is level with the first axial extent. The cup member is adapted such that the upper bottle member snugly nests within the cup member when the downwardly facing bottom surface of the upper bottle member is adjacent the upwardly facing surface of the cup member. The upwardly facing bottom surface is located between the upstanding wall and the first connector.

Another aspect of the present disclosure is a water bottle assembly. The water bottle assembly comprises a water bottle and a bottle holder. The water bottle comprises a hollow body and a bottle finish. The hollow body has an upper portion. The bottle finish extends upwardly from the upper portion of the hollow body. The hollow body defines a cavity capable of receiving and holding liquid. The bottle finish defines an opening arranged and adapted to enable passage of liquid into and out of the cavity via the opening. The water bottle holder comprises a carry loop, a water bottle finish receiving portion, and a card holder. The carry loop at least partially surrounds a finger receiving opening. The finger receiving opening is adapted to enable at least one finger of a user to pass therethrough. The water bottle finish receiving portion has an annular member and an opening. The annular member defines the opening and is adapted to snugly encircle a portion of the water bottle finish when said portion of the bottle finish is located within the opening. The carry loop and the card holder are connected to the annular member. The card holder being dimensioned to receive at least one credit card having a maximum width of approximately 88 mm and a maximum length of approximately 125 mm.

Further features and advantages are described in detail below with reference to the accompanying drawings.

Figure 1:
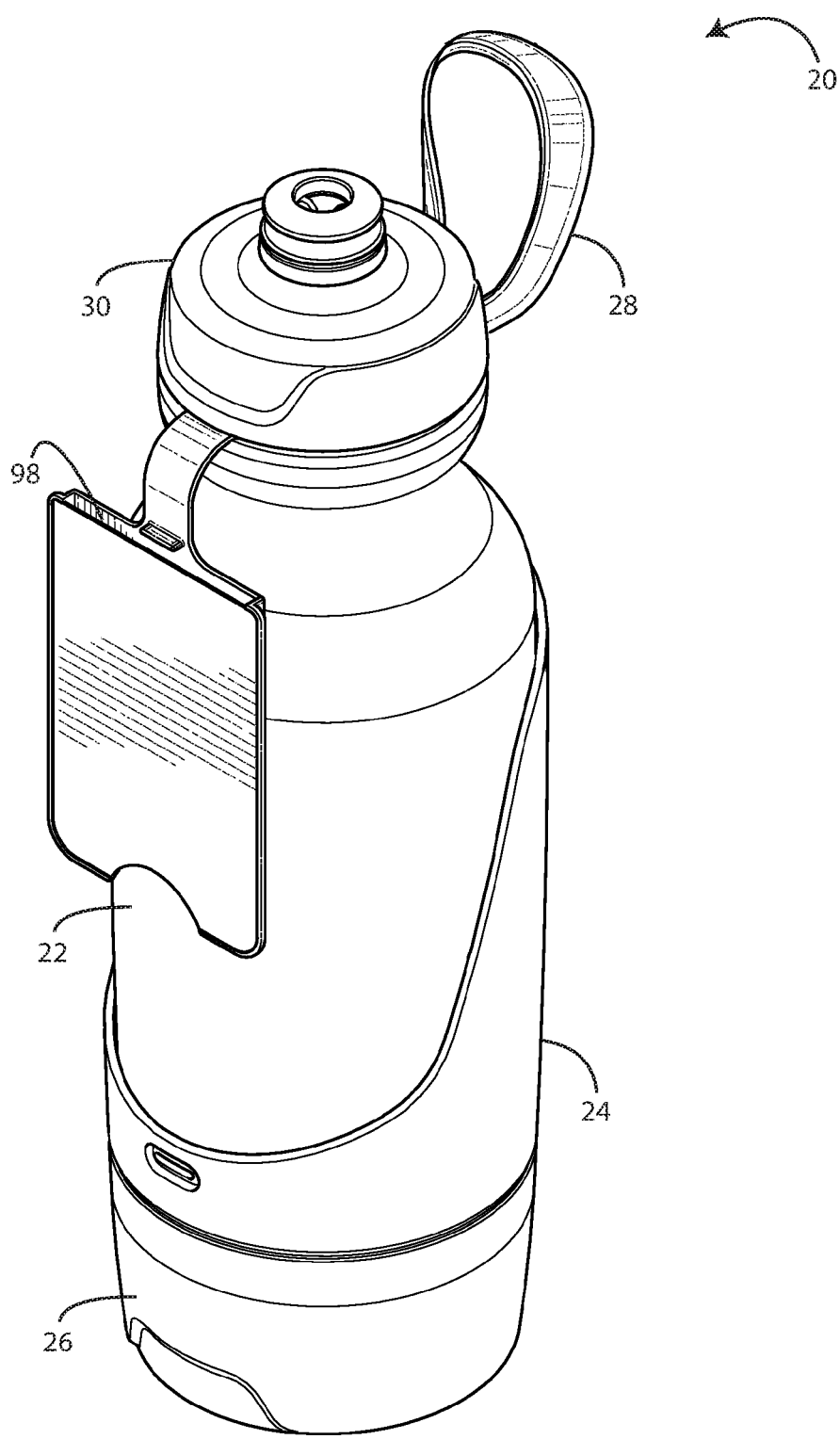
FIG. 1 is a perspective view of an embodiment of a pet water bottle assembly in accordance with the present disclosure, the pet water bottle assembly having a closure, an upper bottle member, an intermediate cup member, a lower storage container, and a bottle holder.

Reference numerals in the written specification and in the drawing figures indicate corresponding items.

DETAILED DESCRIPTION

An embodiment of a pet water bottle assembly in accordance with the present disclosure is indicated by reference numeral 20 in FIG. 1. The pet water bottle assembly 20 comprises an upper bottle member 22, an intermediate cup member 24, and a lower storage container 26. The pet water bottle assembly 20 further comprises a water bottle holder 28 and a closure 30.

Figure 2:
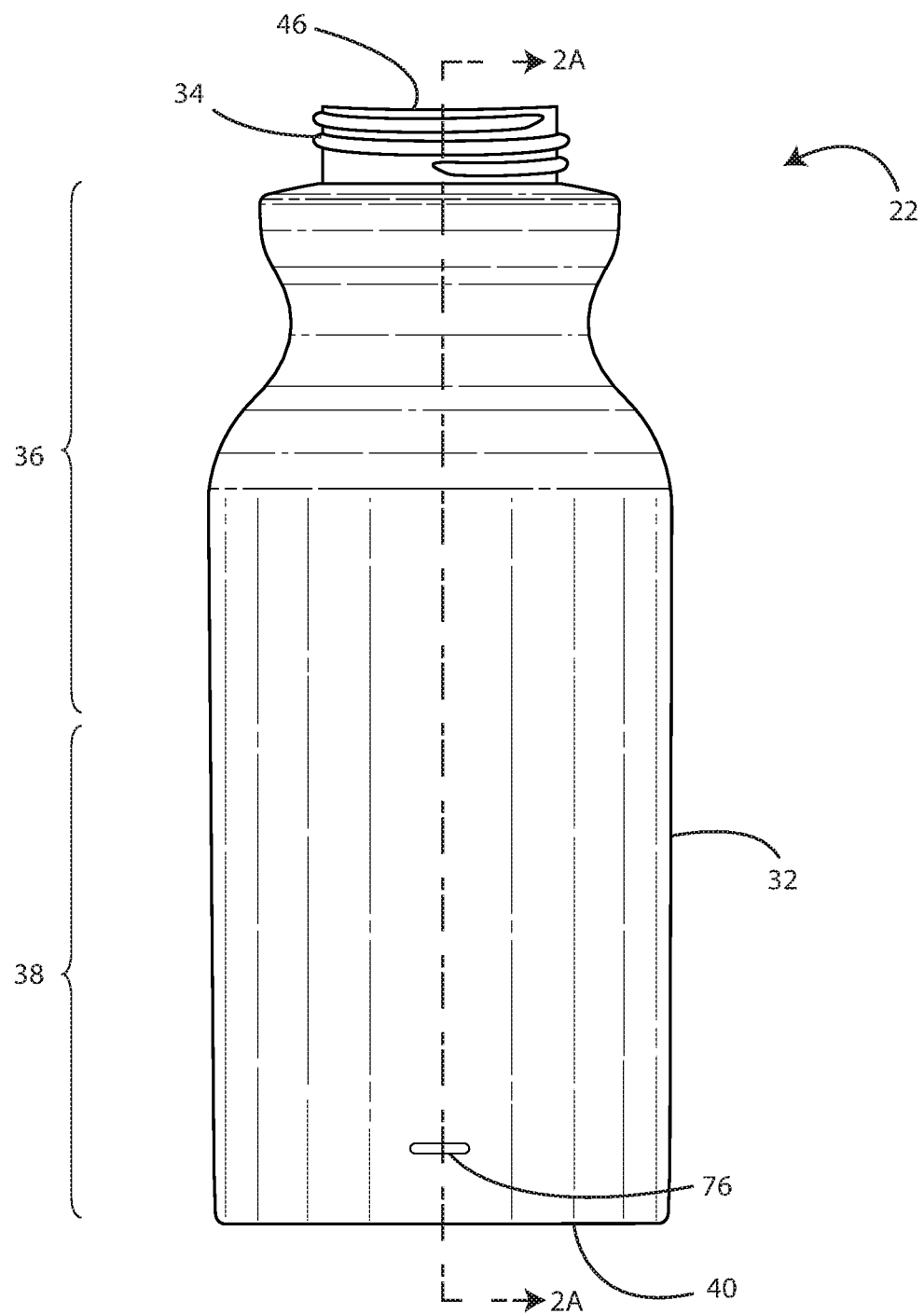
FIG. 2 is a front elevational view of the upper bottle member shown in FIG. 1.
Figure 2A:
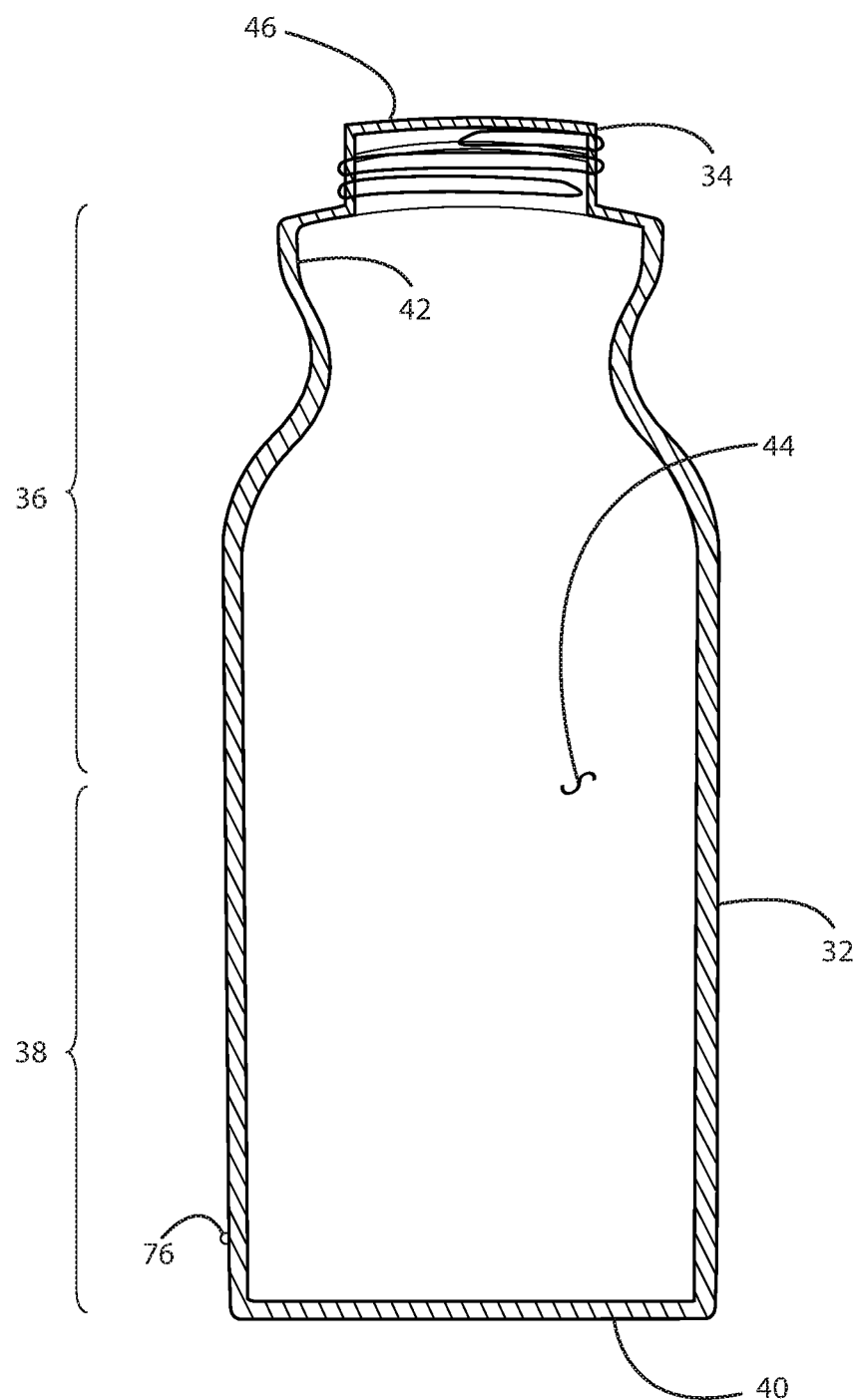
FIG. 2A is a cross-sectional view of the upper bottle member taken along the plane of line 2A-2A of FIG. 2.
Figure 3:
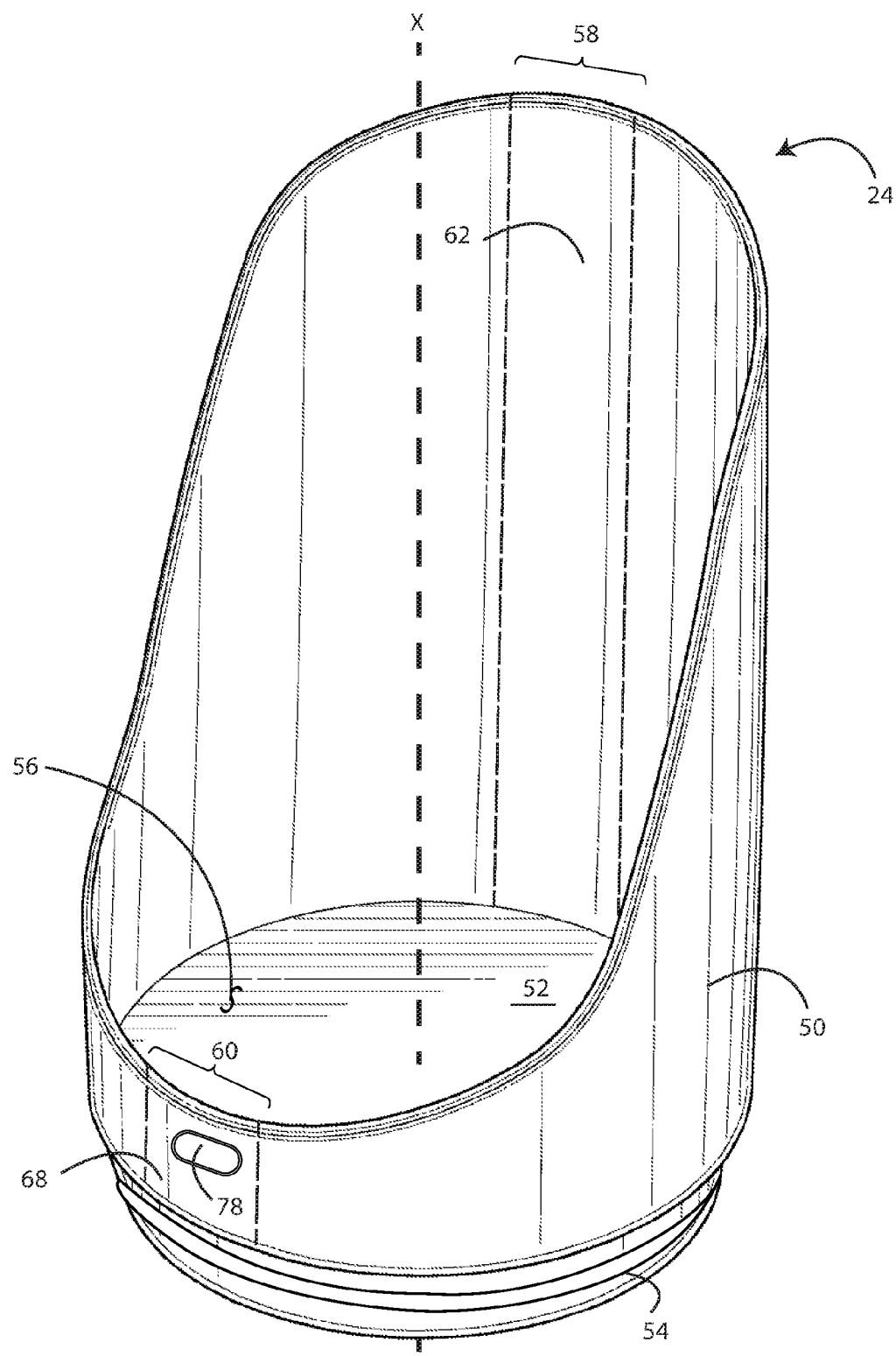
FIG. 3 is perspective view of the intermediate cup member shown in FIG. 1.
Figure 4:
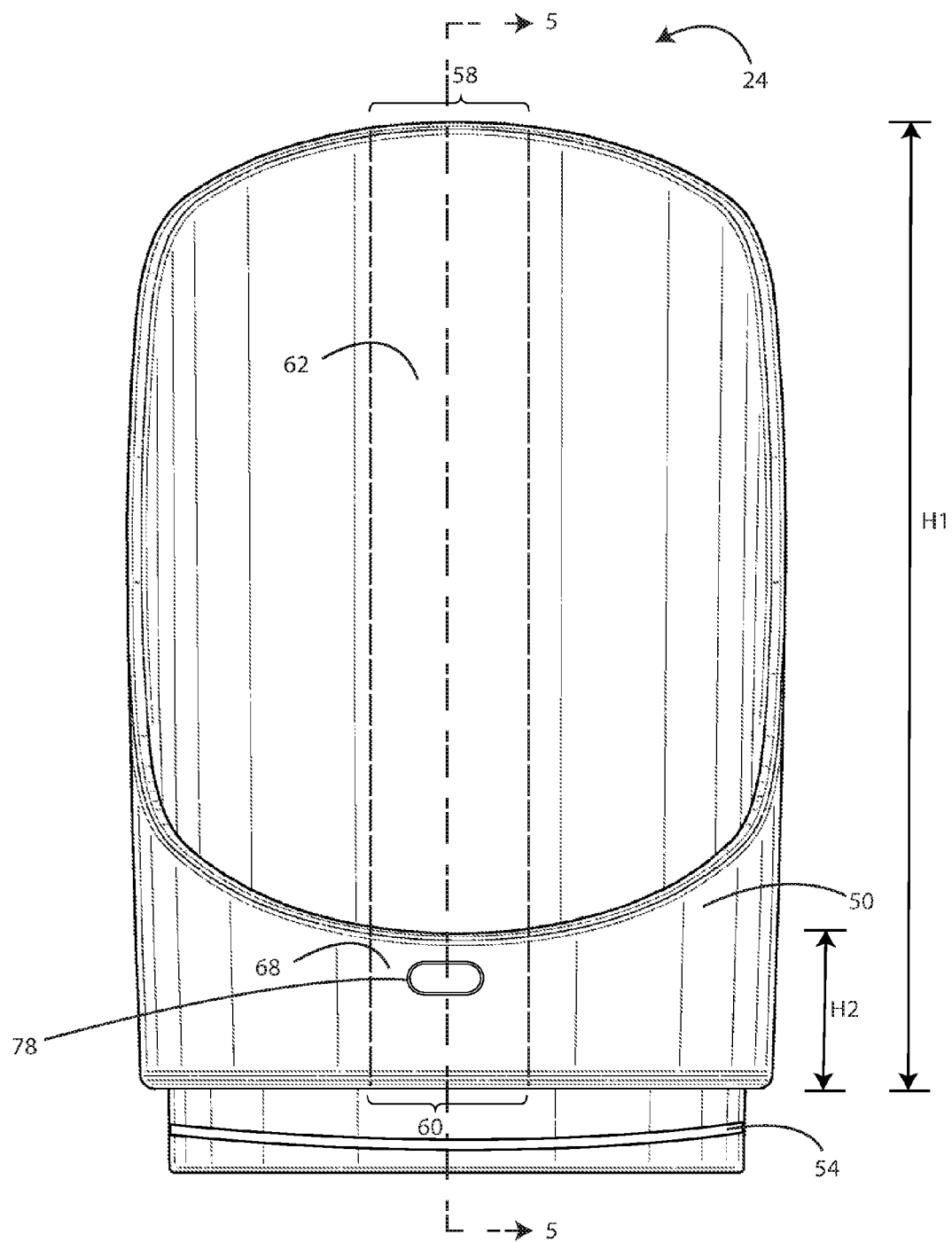
FIG. 4 is a front elevational view of the intermediate cup member of FIG. 3.
Figure 5:
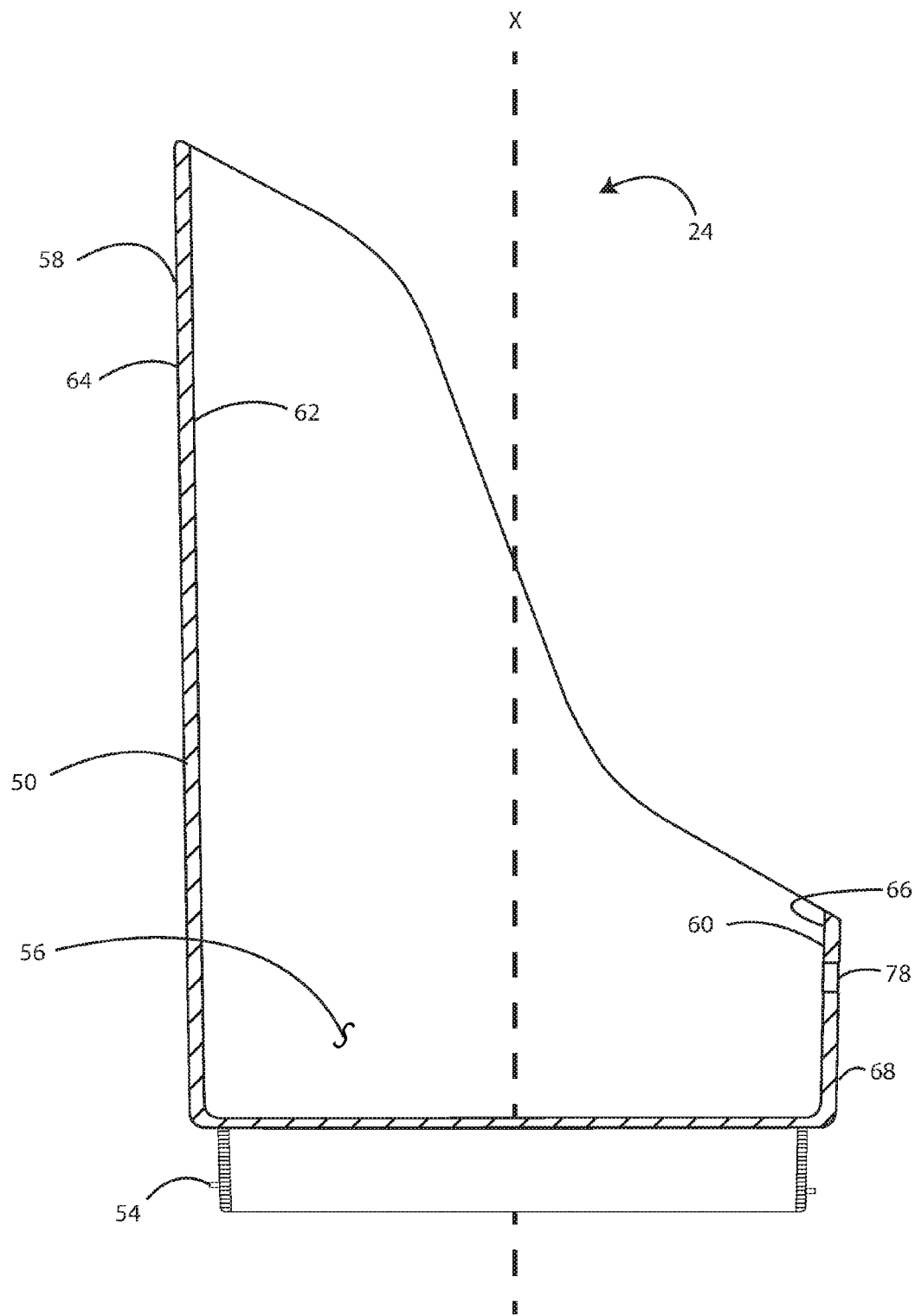
FIG. 5 is a cross-sectional view of the intermediate cup member taken along the plane of line 5-5 of FIG. 4.

As can be seen in FIGS. 2 and 2A, the upper bottle member 22 comprises a hollow body 32 and a bottle finish 34. The hollow body 32 has an upper portion 36 and a lower portion 38. The lower portion 38 has a downwardly facing bottom surface 40. The bottle finish 34 extends upwardly from the upper portion 36. An interior surface 42 of the hollow body 32 defines a cavity 44 capable of receiving and holding liquid (e.g. water). The bottle finish 34 defines an opening 46 arranged and adapted to enable passage of liquid into and out of the cavity 44 via the opening. The bottle finish 34 can comprise various forms of a connector, including (but not limited to) an external thread, an internal thread, or a bayonet connection. The closure 30 is matable with the bottle finish 34 of the upper bottle member 22 to releasably secure the closure to the upper bottle member. The closure 30 can comprise various forms of a connector, including (but not limited to) an internal thread, external thread, or bayonet connection.

Figure 6:
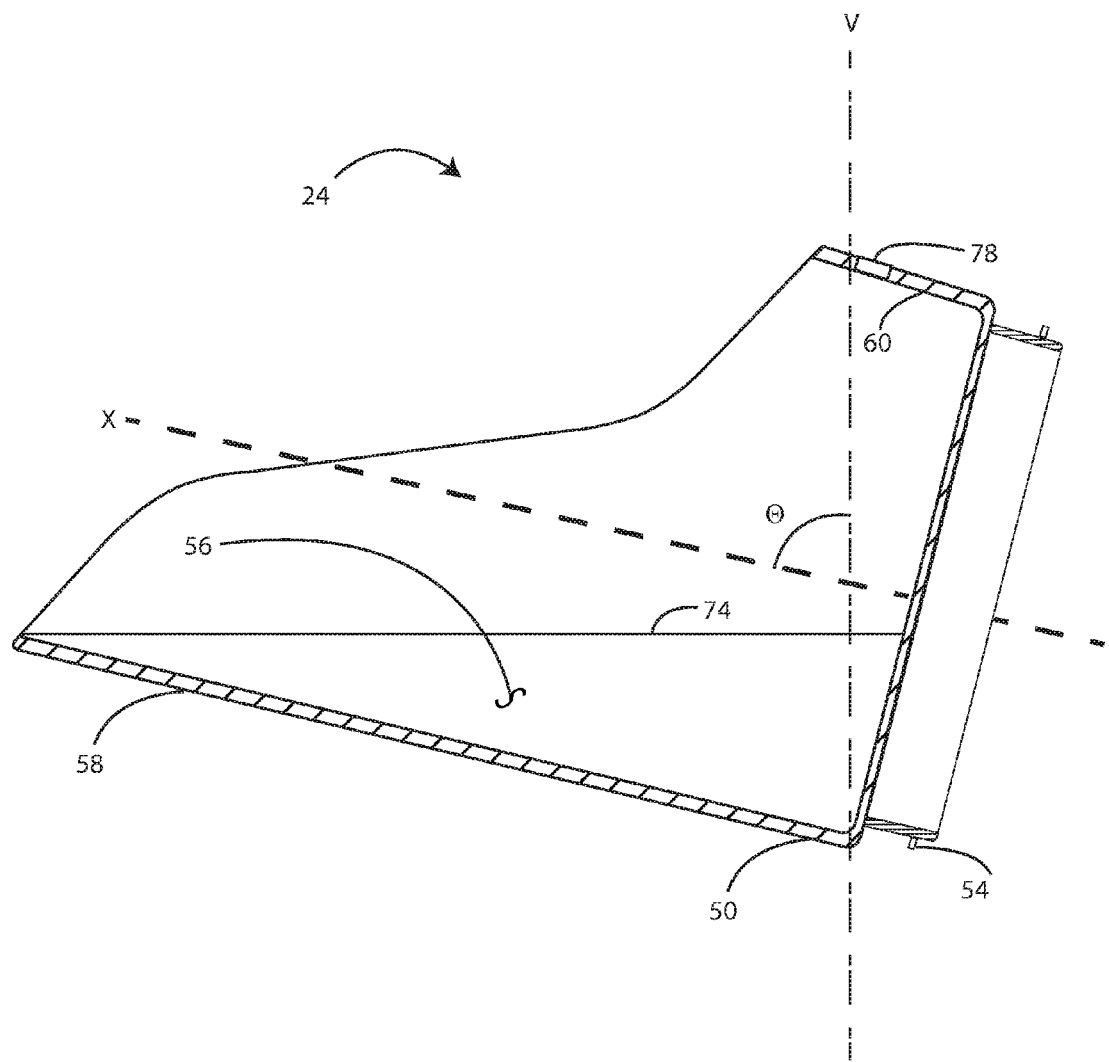
FIG. 6 is a cross-sectional view of the intermediate cup member taken along the plane of line 5-5 in FIG. 4, the intermediate cup member being tilted at a first angle θ from vertical.
Figure 7:
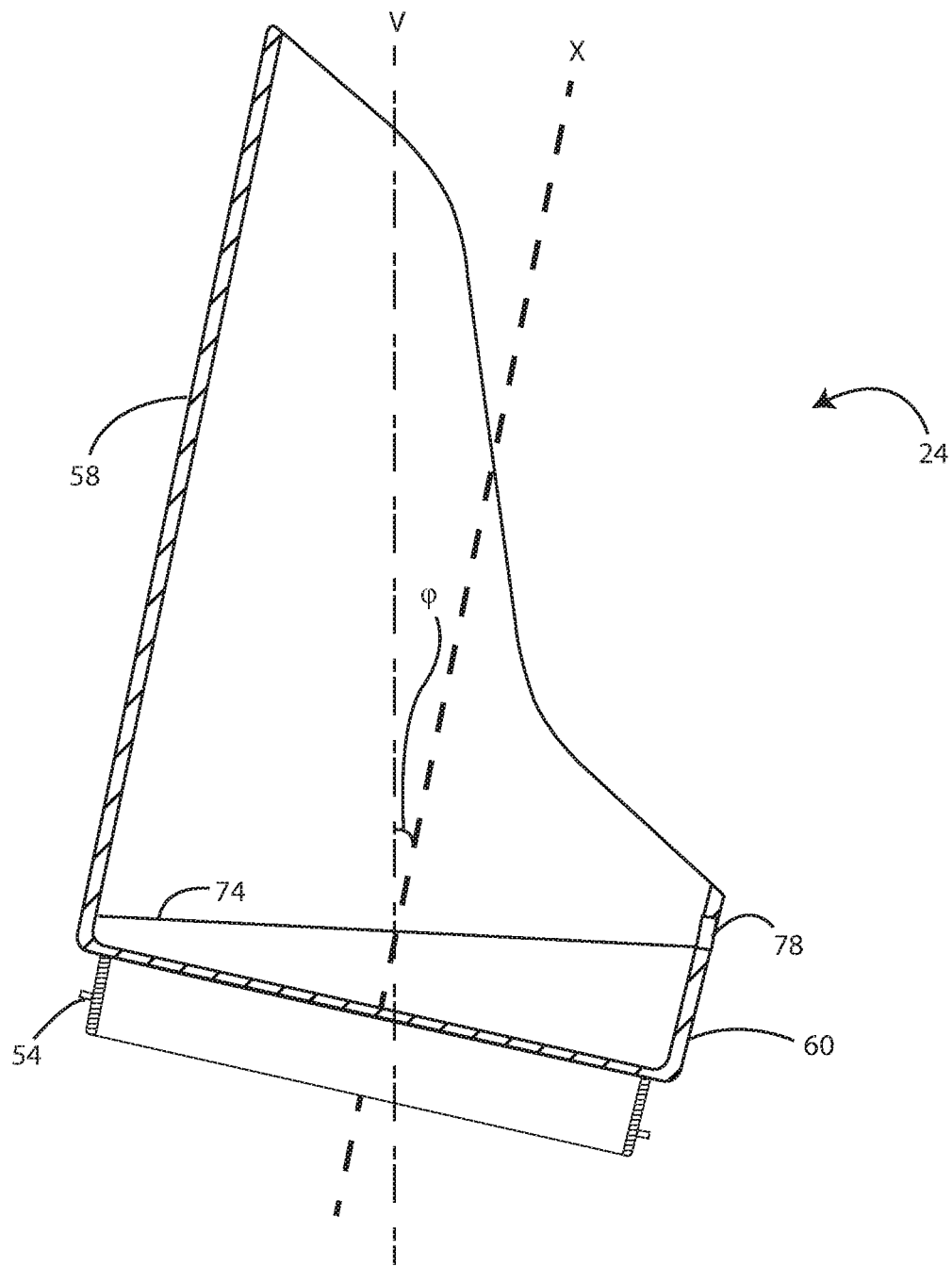
FIG. 7 is a cross-sectional view of the intermediate cup member taken along the plane of line 5-5 in FIG. 4, the intermediate cup member being tilted at a second angle φ from vertical.

As can be seen in FIGS. 3-7, the intermediate cup member 24 has an upstanding wall 50, an upwardly facing bottom surface 52, and a connector 54. The upstanding wall 50 and the upwardly facing bottom surface 52 collectively define a reservoir 56 adapted to hold liquid. The upstanding wall 50 has a first circumferential wall portion 58 and a second circumferential wall portion 60. The first and second circumferential wall portions 58, 60 are diametrically opposite each other relative to a central axis X. Each of the first and second circumferential wall portions 58, 60 may be a portion of the upstanding wall 50 extending circumferentially one-fourth of the circumference of the upstanding wall, or may be a portion of the upstanding wall extending circumferentially more or less than one-fourth of the circumference. The first circumferential wall portion 58 has an inner surface 62 and an outer surface 64. The second circumferential wall portion 60 has an inner surface 66 and an outer surface 68. The inner surfaces 62, 66 and the outer surfaces 64, 68 are curved. The first circumferential wall portion 58 has a first axial extent and the second circumferential wall portion 60 has a second axial extent. The first axial extent is the maximum extent to which liquid within the reservoir 56 can extend along the first circumferential wall portion 58 without spilling when a first quantity of water is within the reservoir. The second axial extent is the maximum extent to which liquid within the reservoir 56 can extend along the second circumferential wall portion 60 without spilling when the first quantity of water is within the reservoir. As shown in FIG. 6, the intermediate cup member 24 is configured such that the central axis X is at a first angle θ from vertical V when the first quantity of water is within the reservoir 56 and a top surface 74 of the first quantity of water is level with the first axial extent 70. As shown in FIG. 7, the intermediate cup member 24 is further configured such that the central axis X is at a second angle φ from vertical V when the first quantity of water is in the reservoir 56 and the top surface 74 of the first quantity of water is level with the second axial extent 72. The first angle θ is greater than the second angle φ.

The first circumferential wall portion 58 has a first wall portion height $H_1$ and the second circumferential wall portion 60 has a second wall portion height $H_2$. Each of the first and second wall portion heights $H_1$, $H_2$ are measured relative to a base location (e.g., the upwardly facing bottom surface 52). The first wall portion height $H_1$ is greater than the second wall portion height $H_2$ to thereby provide a pet enhanced access to liquid within the reservoir 56 when the intermediate cup member 24 is tilted such that a top surface of liquid 74 in the reservoir is level with the first axial extent 70. In the present disclosure, the upwardly facing bottom surface 52 is located between the upstanding wall 50 and the first connector 54.

The intermediate cup member 24 is adapted such that the upper bottle member 22 snugly nests within the intermediate cup member 24 when the downwardly facing bottom surface 40 of the upper bottle member is adjacent the upwardly facing bottom surface 52 of the intermediate cup member. In the present disclosure, the upper bottle member 22 comprises a protrusion 76 protruding outwardly from the lower portion 38 of the hollow body 32. The intermediate cup member 24 comprises a protrusion-receiving opening 78 for receiving the protrusion 76 of the upper bottle member 22 when the upper bottle member is nested within the intermediate cup member. When the protrusion 76 is within the protrusion-receiving opening 78, the upper bottle member 22 is further secured to the intermediate cup member 24.

Figure 10:
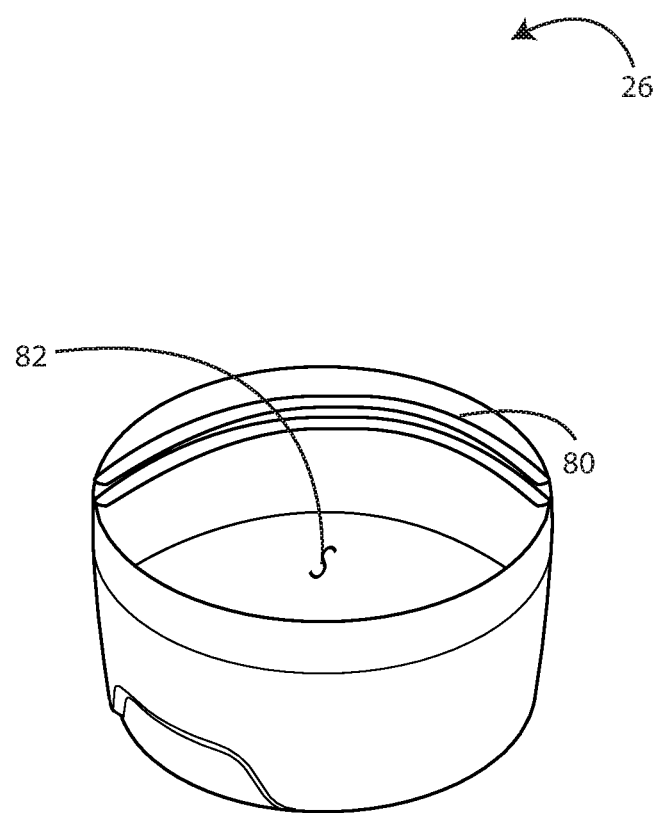
FIG. 10 is a perspective view of the lower storage container shown in FIG. 1.

As shown in FIG. 10, the lower storage container 26 comprises a connector 80. The connector 80 is matable with the connector 54 of the intermediate cup member 24 to releasably secure the lower storage container 26 to the intermediate cup member. In the present disclosure, the connector 80 of the lower storage container 26 comprises a first thread and the connector 54 of the intermediate cup member 24 comprises a second thread, with the second thread being threadably connectable with the first thread to releasably secure the lower storage container to the intermediate storage container. It is to be understood that other types of connectors could be used for connectors 54, 80. The lower storage container 26 and the intermediate cup member 24 collectively define a compartment 82 when the lower storage container is secured to the intermediate cup member, with the compartment being sized and adapted to hold pet food.

Figure 8:
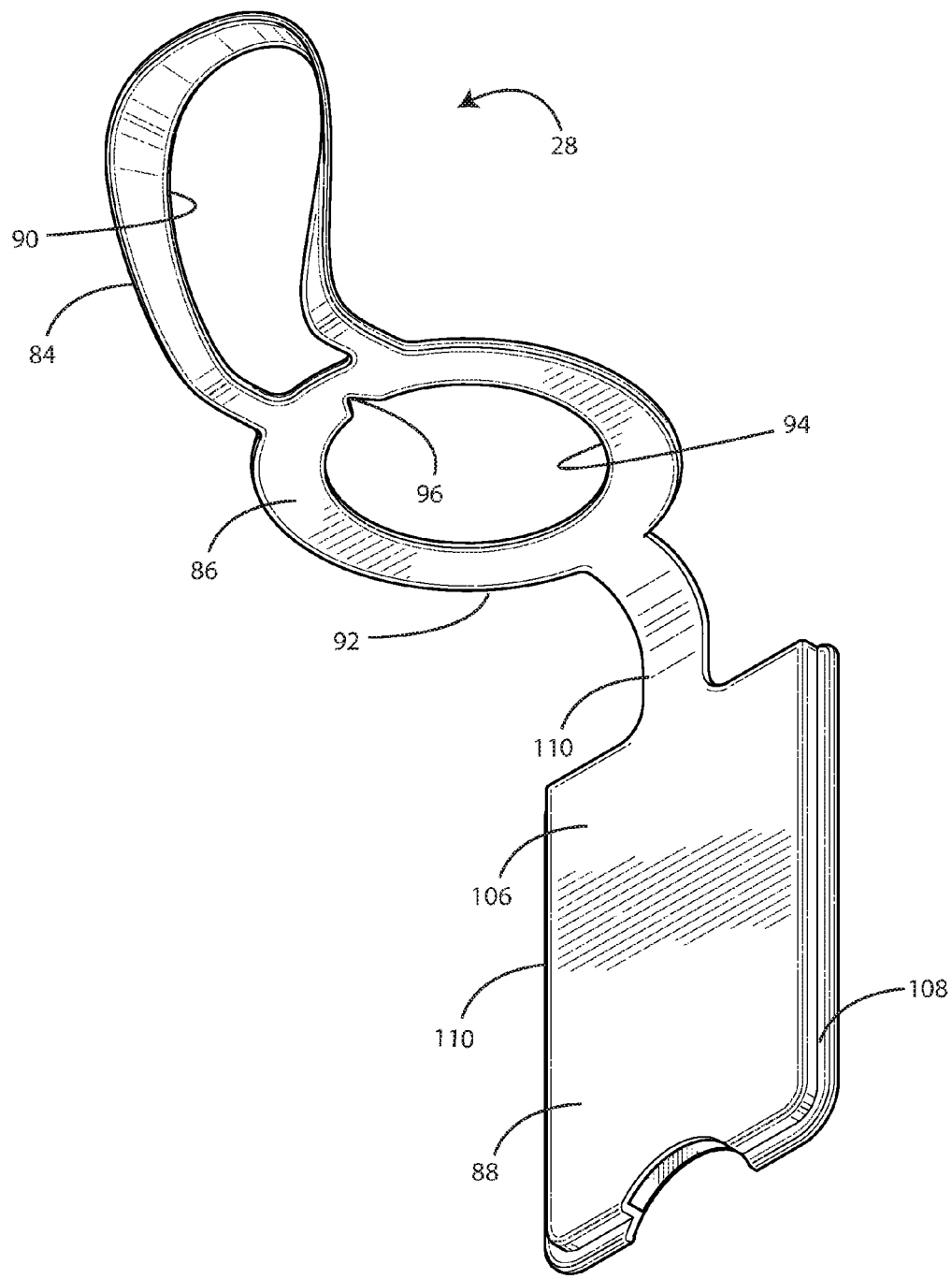
FIG. 8 is a perspective view of the bottle holder shown in FIG. 1.
Figure 9:
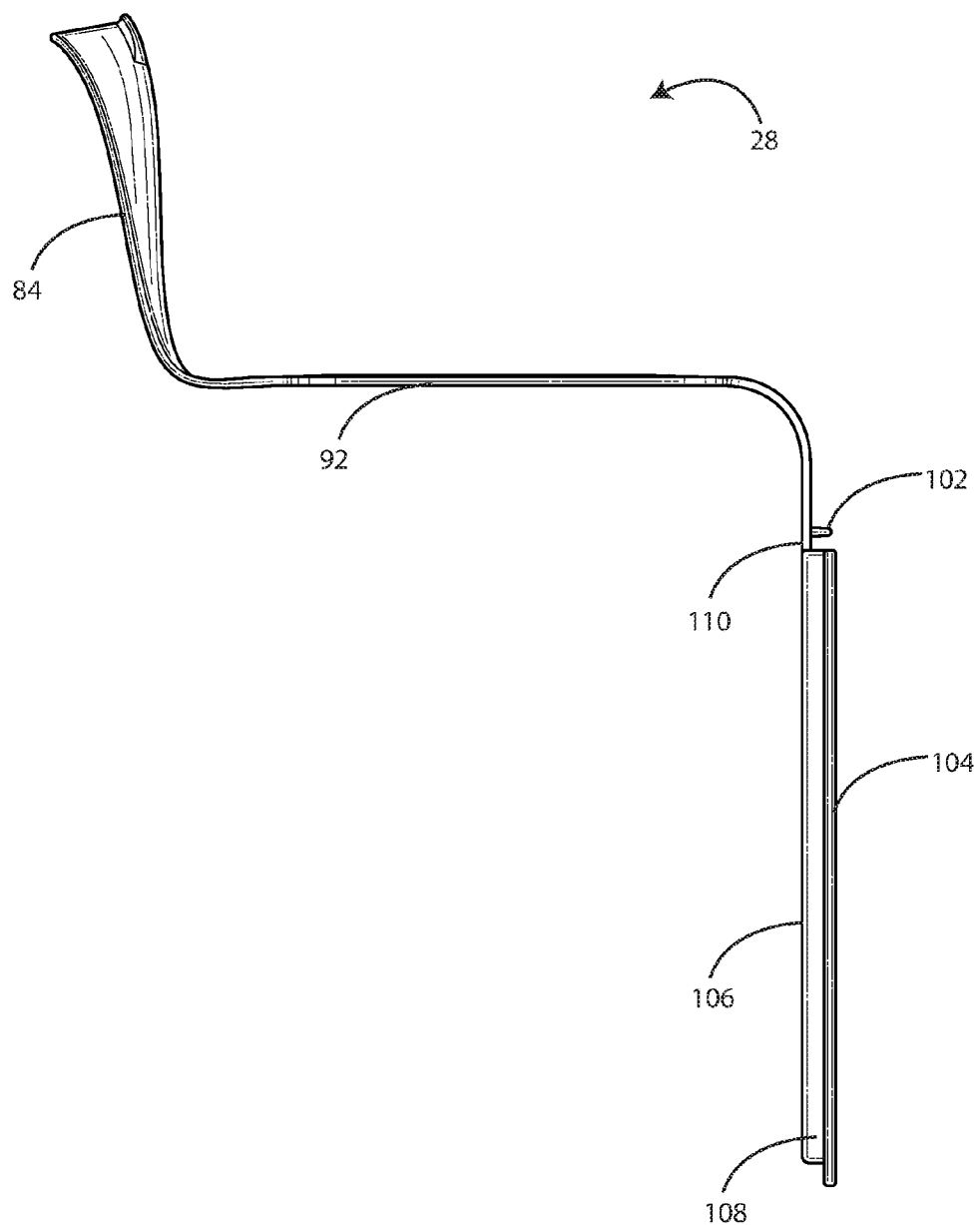
FIG. 9 is a side view of the bottle holder shown in FIG. 8.

As shown in FIGS. 8 and 9, the water bottle holder 28 comprises a carry loop 84, a water bottle finish receiving portion 86, and a card holder 88. The carry loop 84 at least partially surrounds a finger receiving opening 90. The finger receiving opening 90 is adapted to enable at least one finger of a user to pass therethrough. The water bottle finish receiving portion 86 has an annular member 92 and an opening 94. The annular member 92 defines the opening 94 and is adapted to snugly encircle a portion of the water bottle finish 34 when said portion of the bottle finish is located within the opening. In the present embodiment, the annular member 92 comprises a notched region 96. The notched region 96 is sized to enable a portion of the thread of the water bottle finish 34 to be received within it. This enables a user to secure the water bottle holder 28 to the upper bottle member 22 by placing the finish of the bottle within the opening 94 of the finish-receiving portion 86 such that a beginning portion of the thread is located within the notched region 96. The water bottle holder 28 is then able to rotate about the upper bottle member 22 such that the notched region 96 travels along the thread of the water bottle finish 34 until reaching a terminal end of the thread. Upon reaching the terminal end of the thread and being further rotated, the notched region 96 will disengage from the thread (such that the thread is no longer located within the notched region) and the annular member 92 will snugly encircle a portion of the water bottle finish 34. After the closure 30 is releasably secured to the upper bottle member 22, a portion of the annular member 92 is located between the closure and the upper portion 36 of the upper bottle member. The carry loop 84 and the card holder 88 are diametrically opposite each other about a holder axis that extends through a center of the opening 94. The carry loop 84 and the card holder 88 are connected to the annular member 92. The card holder 88 is adapted to receive at least one card having a maximum width of approximately 88 mm and a maximum length of approximately 125 mm, which are the approximate dimensions of an ISO/IEC 7810:2003 ID-3 sized card. Alternatively, the card holder could be adapted to receive at least one card having a maximum width of approximately 74 mm and a maximum length of approximately 74 mm, which are the approximate dimensions of an ISO/IEC 7810:2003 ID-2 sized card. Alternatively, the card holder could be adapted to receive at least one card having a maximum width of approximately 54 mm and a maximum length of approximately 86 mm, which are the approximate dimensions of an ISO/IEC 7810:2003 ID-1 sized card.

In the present disclosure, the card holder 88 comprises an open-top sleeve 98, a connecting member 100, and a flange 102. The sleeve 98 has a front wall 104, a rear wall 106, a first side wall 108, and a second side wall 110. The front wall 104 is spaced from the rear wall 106 by the first and second sidewalls 108, 110. The front wall 104 of the present disclosure is transparent, but it is to be understood that the front wall could be opaque for privacy purposes. The connecting member 100 connects to the rear wall 106 of the sleeve 98. The flange 102 protrudes outwardly from the connecting member 100. The flange 102 is positioned adjacent the sleeve 98 so as to inhibit accidental displacement of a card that is located within the open-top sleeve during movement of the card holder 88.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

What is claimed is:

1. A pet water bottle assembly comprising:
an upper bottle member comprising a hollow body and a bottle finish, the hollow body having an upper portion and a downwardly facing bottom surface, the bottle finish extending upwardly from the upper portion of the hollow body, the hollow body defining a cavity capable of receiving and holding liquid, the bottle finish defining an opening arranged and adapted to enable passage of liquid into and out of the cavity via the opening; and
a cup member having an upstanding wall, an upwardly facing bottom surface, and a first connector, the upstanding wall and the upwardly facing bottom surface collectively defining a reservoir adapted to hold liquid, the upstanding wall having a first circumferential wall portion and a second circumferential wall portion, the first and second circumferential wall portions being diametrically opposite each other relative to a central axis, each of the first and second circumferential wall portions having an inner surface and an outer surface, the first circumferential wall portion having a first axial extent and the second circumferential wall portion having a second axial extent, the first axial extent being the maximum extent to which liquid within the reservoir can extend without spilling when a first quantity of water is within the reservoir, the cup member being configured such that the central axis is at a first angle from vertical when the first quantity of water is within the reservoir and a top surface of the first quantity of water is level with the first axial extent, the second axial extent being the maximum extent to which liquid within the reservoir can extend without spilling when the first quantity of water is within the reservoir, the cup member being configured such that the central axis is at a second angle from vertical when the first quantity of water is in the reservoir and the top surface of the first quantity of water is level with the first axial extent, the first angle being greater than the second angle, the first circumferential wall portion having a first wall portion height and the second circumferential wall portion having a second wall portion height, the first wall portion height being greater than the second wall portion height to thereby provide a pet enhanced access to liquid within the reservoir when the cup member is tilted such that a top surface of liquid in the reservoir is level with the first axial extent, the cup member being adapted such that the upper bottle member snugly nests within the cup member when the downwardly facing bottom surface of the upper bottle member is adjacent the upwardly facing surface of the cup member, the upwardly facing bottom surface being located between the upstanding wall and the first connector.

2. A pet water bottle assembly as set forth in claim 1 wherein the cup member is an intermediate cup member and the assembly further comprises a lower storage container, the lower storage container comprising a second connector, the second connector being matable with the first connector to releasably secure the lower storage container to the intermediate cup member.

3. A pet water bottle assembly as set forth in claim 2 wherein the first connector comprises a first thread and the second connector comprises a second thread, the second thread being threadably connectable with the first thread to releasably secure the lower storage container to the intermediate cup member.

4. A pet water bottle assembly as set forth in claim 1 wherein the pet water bottle assembly further comprises a closure, the closure having a connector, the connector of the closure being matable with the bottle finish of the upper bottle member to releasably secure the closure to the upper bottle member.

5. A pet water bottle assembly as set forth in claim 1 wherein the pet water bottle assembly comprises a water bottle holder, the water bottle holder having a carry loop, a water bottle finish receiving portion, and a card holder, the carry loop at least partially surrounding a finger receiving opening, the finger receiving opening being adapted to enable at least one finger of a user to pass therethrough, the water bottle finish receiving portion having an annular member and an opening, the annular member defining the opening and being adapted to snugly encircle a portion of a water bottle finish when the portion of the water bottle finish is located within the opening, the carry loop and the card holder being connected to the annular member, the card holder comprising an open-top sleeve adapted to receive at least one card having a maximum width of approximately 88 mm and a maximum length of approximately 125 mm.

6. A pet water bottle assembly as set forth in claim 5 wherein at least a portion of the finish receiving portion of the water bottle holder is located between the upper portion of the upper bottle member and the closure when the closure is releasably secured to the upper bottle member.

7. A water bottle assembly comprising:
a water bottle comprising a hollow body and a bottle finish, the hollow body having an upper portion and a downwardly facing bottom surface, the bottle finish extending upwardly from the upper portion of the hollow body, the hollow body defining a cavity capable of receiving and holding liquid, the bottle finish defining an opening arranged and adapted to enable passage of liquid into and out of the cavity via the opening; and
a bottle holder comprising a carry loop, a water bottle finish receiving portion, and a card holder, the carry loop at least partially surrounding a finger receiving opening, the finger receiving opening being adapted to enable at least one finger of a user to pass therethrough, the water bottle finish receiving portion having an annular member and an opening, the annular member defining the opening and being adapted to snugly encircle a portion of the bottle finish when said portion of the bottle finish is located within the opening, the carry loop and the card holder being connected to the annular member, the card holder being dimensioned to receive at least one credit card having a maximum width of approximately 88 mm and a maximum length of approximately 125 mm.

8. A water bottle assembly as set forth in claim 7 wherein the card holder comprises an open-top sleeve.

9. A water bottle assembly as set forth in claim 8 wherein the sleeve comprises a front wall, a rear wall, and first and second sidewalls, the front wall being spaced from the rear wall by the first and second sidewalls.

10. A water bottle assembly as set forth in claim 9 wherein the front wall is transparent.

11. A water bottle assembly as set forth in claim 8 wherein the assembly comprises a closure, the closure having a connector that is matable with the bottle finish of the water bottle to releasably secure the closure to the water bottle, at least a portion of the water bottle finish receiving portion being located between the closure and the upper portion of the water bottle.

* * * * *